United States Patent
Oh et al.

(10) Patent No.: US 10,275,783 B2
(45) Date of Patent: Apr. 30, 2019

(54) METHOD FOR PROVIDING PERSONALIZED INFORMATION AND PUBLIC INFORMATION

(75) Inventors: Hyun-joo Oh, Seoul (KR); Sun-ae Kim, Seoul (KR); Hyung-rae Cho, Seoul (KR); Ji-Young Kwahk, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 61 days.

(21) Appl. No.: 13/026,593

(22) Filed: Feb. 14, 2011

(65) Prior Publication Data
US 2011/0199539 A1 Aug. 18, 2011

(30) Foreign Application Priority Data
Feb. 12, 2010 (KR) .................. 10-2010-0013589

(51) Int. Cl.
*H04N 7/18* (2006.01)
*G06Q 30/02* (2012.01)

(52) U.S. Cl.
CPC .................................... *G06Q 30/02* (2013.01)

(58) Field of Classification Search
CPC ............. H04N 21/4532; H04N 21/462; H04N 21/4661; H04N 21/441
USPC ...... 725/37, 40, 44, 46, 51, 54, 74, 82, 105, 725/115, 133, 142
See application file for complete search history.

(56) References Cited

U.S. PATENT DOCUMENTS

| | | | |
|---|---|---|---|
| 5,831,664 A * | 11/1998 | Wharton et al. .............. | 725/81 |
| 5,986,650 A * | 11/1999 | Ellis et al. ...................... | 725/40 |
| 6,202,062 B1 | 3/2001 | Cameron et al. | |
| 7,809,549 B1 * | 10/2010 | Bangalore ............. | G06F 17/289 704/2 |
| 7,856,646 B1 * | 12/2010 | Groff ..................... | G06Q 30/00 725/34 |
| 2004/0073915 A1 | 4/2004 | Dureau | |
| 2004/0139400 A1 | 7/2004 | Allam et al. | |
| 2005/0160458 A1 * | 7/2005 | Baumgartner ......... | H04H 60/46 725/46 |
| 2005/0198044 A1 | 9/2005 | Kato et al. | |
| 2006/0090185 A1 * | 4/2006 | Zito et al. ........................ | 725/46 |

(Continued)

FOREIGN PATENT DOCUMENTS

| KR | 1020080005068 A | 1/2008 |
|---|---|---|
| KR | 1020080104463 | 12/2008 |
| WO | WO 2008/026837 | 3/2008 |

OTHER PUBLICATIONS

European Search Report dated Nov. 20, 2014 issued in counterpart application No. 11742462.2-1955.

(Continued)

*Primary Examiner* — John R Schnurr
(74) *Attorney, Agent, or Firm* — The Farrell Law Firm, P.C.

(57) ABSTRACT

A method for providing information in a content providing system is provided, which includes generating public information and personalized information regarding content, identifying a first display apparatus corresponding to the public information, identifying a second display apparatus corresponding to the personalized information, transmitting the public information the first display apparatus, and transmitting the personalized information to the second display apparatus.

5 Claims, 15 Drawing Sheets

(56) References Cited

U.S. PATENT DOCUMENTS

| | | | |
|---|---|---|---|
| 2008/0066138 A1* | 3/2008 | Bishop | G06F 17/289 |
| | | | 725/137 |
| 2008/0229217 A1 | 9/2008 | Kembel et al. | |
| 2009/0183221 A1* | 7/2009 | Klein | H04N 7/17318 |
| | | | 725/131 |
| 2009/0187944 A1 | 7/2009 | White et al. | |
| 2009/0244372 A1* | 10/2009 | Petronelli et al. | 348/468 |
| 2010/0229194 A1* | 9/2010 | Blanchard | G06F 3/038 |
| | | | 725/39 |
| 2010/0332570 A1* | 12/2010 | Roberts | G06F 17/30029 |
| | | | 707/912 |

OTHER PUBLICATIONS

Chinese Office Action dated Mar. 27, 2015 issued in counterpart application No. 201180009321.2.
Chinese Office Action dated Dec. 9, 2015 issued in counterpart application No. 201180009321.2, 15 pages.
Korean Office Action dated Feb. 12, 2016 issued in counterpart application No. 10-2010-0013589, 11 pages.
Chinese Office Action dated Jun. 6, 2016 issued in counterpart application No. 201180009321.2, 7 pages.
Chinese Office Action dated Dec. 7, 2016 issued in counterpart application No. 201180009321.2, 7 pages.

* cited by examiner

METHOD FOR PROVIDING PERSONALIZED INFORMATION AND PUBLIC INFORMATION

PRIORITY

This application claims priority to Korean Patent Application No. 2010-0013589, which was filed in the Korean Intellectual Property Office on Feb. 12, 2010, the entire disclosure of which is incorporated herein by reference.

BACKGROUND OF THE INVENTION

1. Field of the Invention

The present invention relates generally to a method for providing information, and more particularly, to a method for providing information in a content providing system capable of interactive communication.

2. Description of the Related Art

Recently, with the development of mobile device technologies, mobile devices now provide various functions. In addition, as a result of increased the development of communication technologies, mobile devices are capable of communicating with other apparatuses and may be operated in association with these other apparatuses. For example, a mobile device may provide various functions as being communicably connected to a television.

However, as functions of mobile devices have become more complex, a user often has to perform more complicated procedures to use these functions of the mobile devices. Therefore, the user may waste a considerable amount of time to receive desired information using a mobile device.

Further, if mobile apparatuses are connected to a TeleVision (TV), the users of the apparatuses should go through an authentication process and a search process to search desired information, which may cause inconvenience to the users.

Accordingly, a method for enabling a user to conveniently use functions performed in a mobile device in association with other apparatuses is required.

SUMMARY OF THE INVENTION

The present invention is designed to address at least the aforementioned problems and/or disadvantages and to provide at least the advantages described below.

An aspect of the present invention is to provide a method for providing information by receiving apparatus information from a user apparatus, obtaining a user profile corresponding to the apparatus information, and generating public information and personalized information corresponding to the user profile so as to provide the public information to an image apparatus and the personalized information to a user apparatus.

In accordance with an aspect of the present invention, a method for providing information in a content providing system including a content providing server is provided. The method includes generating, by the content providing server, public information and personalized information regarding content; identifying a first display apparatus corresponding to the public information; identifying a second display apparatus corresponding to the personalized information; transmitting the public information the first display apparatus; and transmitting the personalized information to the second display apparatus.

In accordance with another aspect of the present invention, a method for providing information in a content providing system including a content providing server and a first display apparatus. The method includes receiving, by the first display apparatus, content from the content providing server; generating, by the first display apparatus, public information and personalized information regarding the content; identifying a second display apparatus corresponding to the personalized information; and transmitting, by the first display apparatus, the personalized information to the second display apparatus.

BRIEF DESCRIPTION OF THE DRAWINGS

The above and/or other aspects, features, and advantages of certain embodiments of the present invention will be more apparent from the following description taken in conjunction with reference to the accompanying drawings, in which.

DETAILED DESCRIPTION OF EMBODIMENTS OF THE INVENTION

Figure 1:
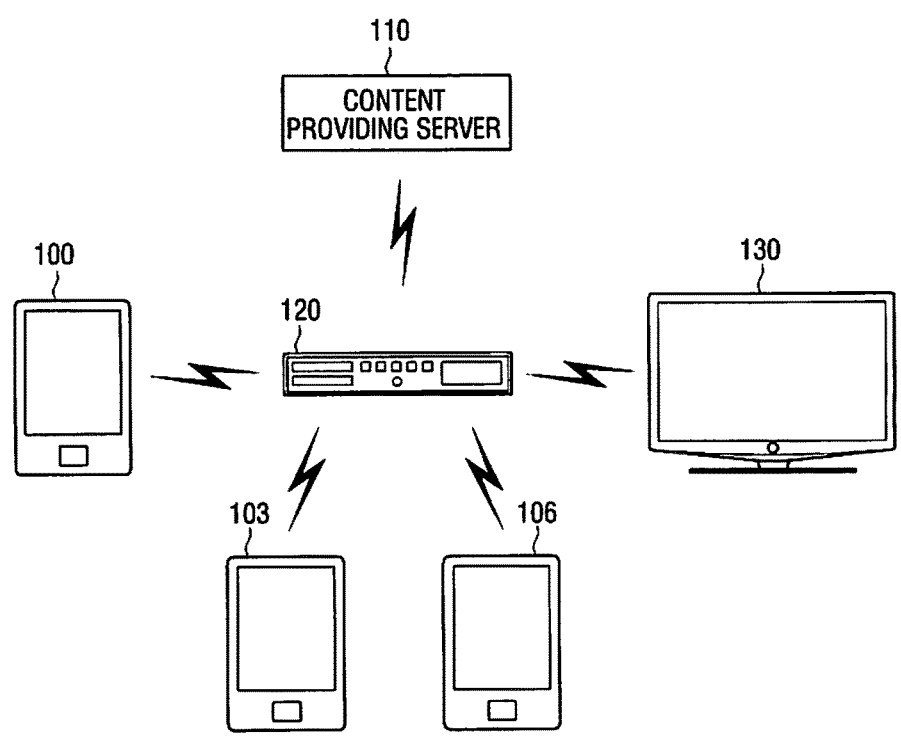
FIG. 1 illustrates a content providing system according to an embodiment of the present invention.

Various embodiments of the present invention are described in detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. However, these and other embodiments can be practiced without those specifically defined matters. Also, well-known functions or constructions are not described in detail, to avoid obscuring the description with unnecessary detail.

In the following description, "Apparatus information" refers to information that defines a user apparatus and differs depending on the type of a user apparatus. For example, apparatus information may include at least one of a telephone number, apparatus IDentification (ID), a Media Access Control (MAC) address, and a user ID. If a user apparatus is a mobile phone, then it is common for apparatus information to include a telephone number.

A "user profile" refers to information on a user and often corresponds to apparatus information. A user profile is stored in a content providing server or a set-top box for each apparatus information. Accordingly, the content providing server or the set-top box extracts a user profile from the user apparatus based on received apparatus information.

A user profile may include a user's personal information or information on usage history. For example, a user's personal information represents information regarding the user and includes at least one of age, gender, vocation, hobby, nationality, preferred genre, and preferred channel. The information on usage history may include at least one of a list of content purchased by the user and a list of content watched by the user.

"Personalized information" refers to information that is generated to correspond to a user profile and used in a user apparatus. That is, the personalized information represents information that is appropriately selected for a user based on the user's profile. For example, the personalized information may generated by a content providing server or a set-top box based on a user profile. Personalized information is generated based on a user's personal information and may include a recommended channel, recommended content, and/or a commercial. In addition, personalized information may include a list of broadcast programs or a list of content generated based on information on usage history of a user.

For example, if a first user is an adult, a second user is a child, and personalized information includes a recommended channel, a content providing server or a set-top box generates a channel list including channels more suitable for an adult as the personalized information of the first user and a channel list including channels more suitable for a child as the personalized information of the second user.

"Public information" is information to be displayed publically, e.g., on a TV, and represents information regarding content. For example, public information may include Electronic Program Guide (EPG) information, rating information, and viewing rate information. The public information may be generated by a content providing server or a set-top box.

FIG. 1 illustrates a content providing system according to an embodiment of the present invention.

Referring to FIG. 1, the content providing system includes a first user apparatus 100, a second user apparatus 103, a third user apparatus 106, a content providing server 110, a set-top box 120, and a TV 130, which are communicably connected with each other through a mobile communication network or an internet network. The first user apparatus 100, the second user apparatus 103, and the third user apparatus 106 are separate apparatuses from each other and may each be used by a different user respectively. For example, each of user apparatuses 100, 103, and 106 may be a mobile phone, a media planner, a portable content reproducing apparatus (such as an MP3 player or a Personal Media Player (PMP)), a Personal Digital Assistant (PDA), or a mobile computer. Hereinafter, operations of a user apparatus will be described with respect to the first user apparatus 100.

The user apparatus 100 transmits a request for personalized information and apparatus information to the content providing server 110 or the set-top box 120, and receives personalized information from the content providing server 110 or the set-top box 120 in response. Thereafter, the user apparatus 100 displays the personalized information on a screen or performs a function using the personalized information.

The content providing server 110 transmits content to the set-top box to display the content on the TV 130. The content providing server 110 receives apparatus information from the user apparatus 100 or the set-top box 120. The content providing server 110 transmits apparatus information received from the user apparatus 100 to the set-top box 120. The content providing server 110 extracts a user profile corresponding to the apparatus information. The content providing server 110 may transmit the user profile to the set-top box 120. In addition, the content providing server 110 may generate personalized information and public information using the user profile.

The content providing server 110 transmits generated personalized information to the user apparatus 100 and generated public information to the set-top box 120 or the TV 130.

The set-top box 120 transmits content received from the content providing server 110 to the TV 130. The set-top box 120 receives apparatus information from the user apparatus 100 or the content providing server 110. The set-top box 120 may transmit apparatus information received from the user apparatus 100 to the content providing server 110. The set-top box 120 extracts a user profile corresponding to apparatus information. The set-top box 120 transmits the user profile to the content providing server 100. In addition, the set-top box 120 generates personalized information and public information using the user profile, transmits the generated personalized information to the user apparatus 100, and transmits the generated public information to the TV 130.

The TV 130 displays received content on a screen, and displays provided public information on the screen.

Accordingly, using a content providing system as illustrated in FIG. 1, a user may receive personalized information using the user apparatus 100. Specifically, as the user apparatus 100 receives personalized information corresponding to apparatus information, a user may view his or her own personalized information using the user apparatus 100 without inputting or searching for his or her information.

Figure 2:
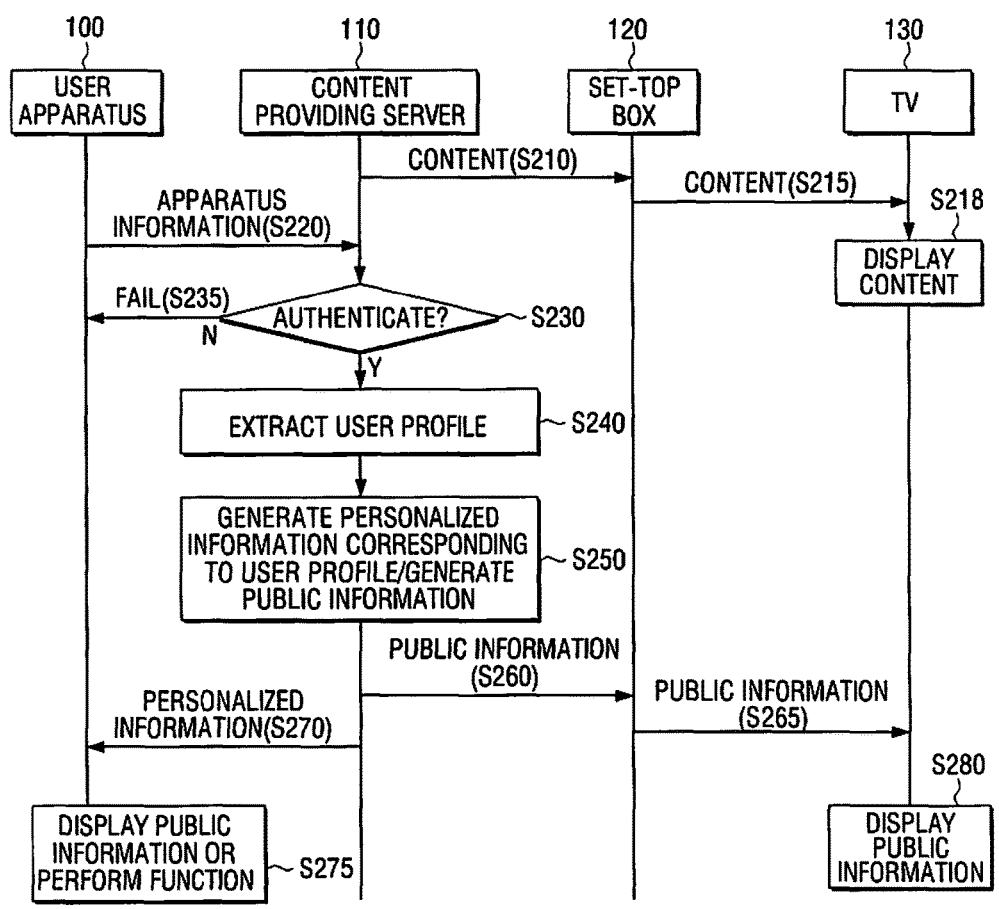
FIG. 2 is a flowchart illustrating a process of providing public information and personalized information in a content providing system according to an embodiment of the preset invention.

FIG. 2 is a flowchart illustrating a process of providing public information and personalized information in a content providing system according to an embodiment of the preset invention. Specifically, FIG. 2 illustrates the content providing server 110 receiving apparatus information and extracting a user profile to generate personalized and public information.

Referring to FIG. 2, the content providing server 110 transmits content to the set-top box 120 in step S210. In step S215, the set-top box 120 transmits the received content to the TV 130. The TV 130 displays the received content in step S218.

A user inputs a command to receive personalized information through the user apparatus 100, and the user apparatus 100 transmits apparatus information to the content providing server 110 in step S220. In step S230, the content providing server 110 authenticates the user apparatus 100 using the received apparatus information, e.g., by determining whether the user apparatus 100 is authorized to access the content providing server 110.

If the authentication fails, the content providing server 100 transmits an authentication failure message to the user apparatus 100 in step S235. In this case, the user apparatus 100 is not authorized to access the content providing server 110 and the process is terminated.

However, if the authentication is successful, the content providing server 110 extracts a user profile corresponding to the received apparatus information in step S240. For example, the content providing server 110 stores a user profile database corresponding to user profiles in a plurality of apparatus information and extracts a user profile corresponding to apparatus information received from the user apparatus 100 from the user profile database.

In step S250, the content providing server 110 generates personalized information corresponding to a user profile along with public information corresponding to the content. Herein, the personalized information is information generated to correspond to a user profile and used in the user apparatus 100. The public information is information to be displayed on the TV 130 and related to a content.

In step S260, the content providing server 110 transmits public information to the set-top box 120. The set-top box 120 transmits public information to the TV 130 in step S265. Thereafter, the TV 130 displays the received public information on the screen in step S280. For example, the TV 130 displays EPG information and rating information on the screen as public information.

In addition, the content providing server 110 transmits personalized information to the user apparatus 100 in step S270. Subsequently, the user apparatus 100 displays the personalized information on the screen or performs a function using the personalized information in step S275. For example, if the personalized information is information on a recommended channel, the user apparatus 100 displays received information regarding a recommended channel on the screen.

Through the above-described process illustrates in FIG. 2, a content providing system provides personalized information corresponding to a user to the user apparatus 100 based on apparatus information. Accordingly, the user may receive and view his or her personalized information through the user apparatus 100 without inputting personal information.

Figure 3:
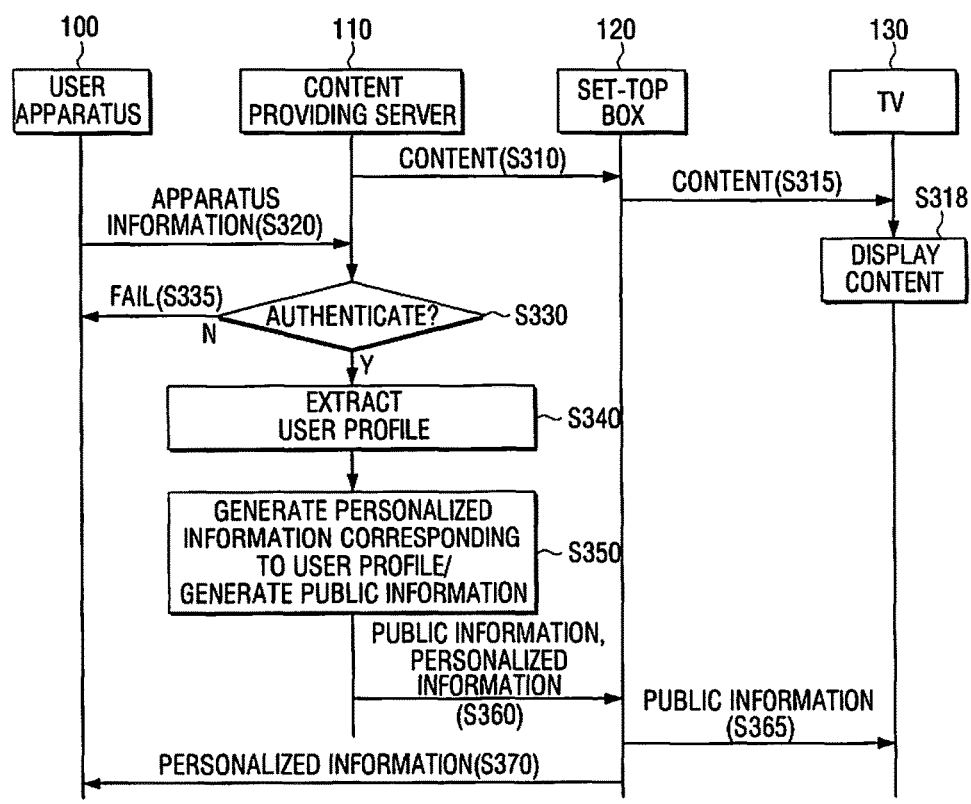
FIG. 3 is a flowchart illustrating a process of providing public information and personalized information in a content providing system according to an embodiment of the present invention.

FIG. 3 is a flowchart illustrating a process of providing public information and personalized information in a content providing system according to an embodiment of the present invention. Specifically, FIG. 3 illustrates the content providing server 110 receiving apparatus information, extracting a user profile, and generating personalized information and public information. However, unlike in FIG. 2, the content providing server 120 personalized information to the user apparatus 100 through the set-top box 120.

Additionally, because steps S310 to S350 are identical to steps S210 to S250 a repetitive description of these steps will not be provided below.

Referring to FIG. 3, in step S360, the content providing server 110 transmits public information and personalized information to the set-top box 120. The set-top box 120 the transmits public information to the TV 130 in step S365. Subsequently, the TV 130 displays the received public information on the screen. For example, the TV 130 displays EPG information and rating information on the screen as public information.

In addition, in step S370, the set-top box 120 transmits the personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described process illustrated in FIG. 3, a content providing system provides personalized information corresponding to a user to the user apparatus 100 based on apparatus information. Accordingly, the user may receive and view his or her personalized information through the user apparatus 100 without inputting personal information.

Figure 4:
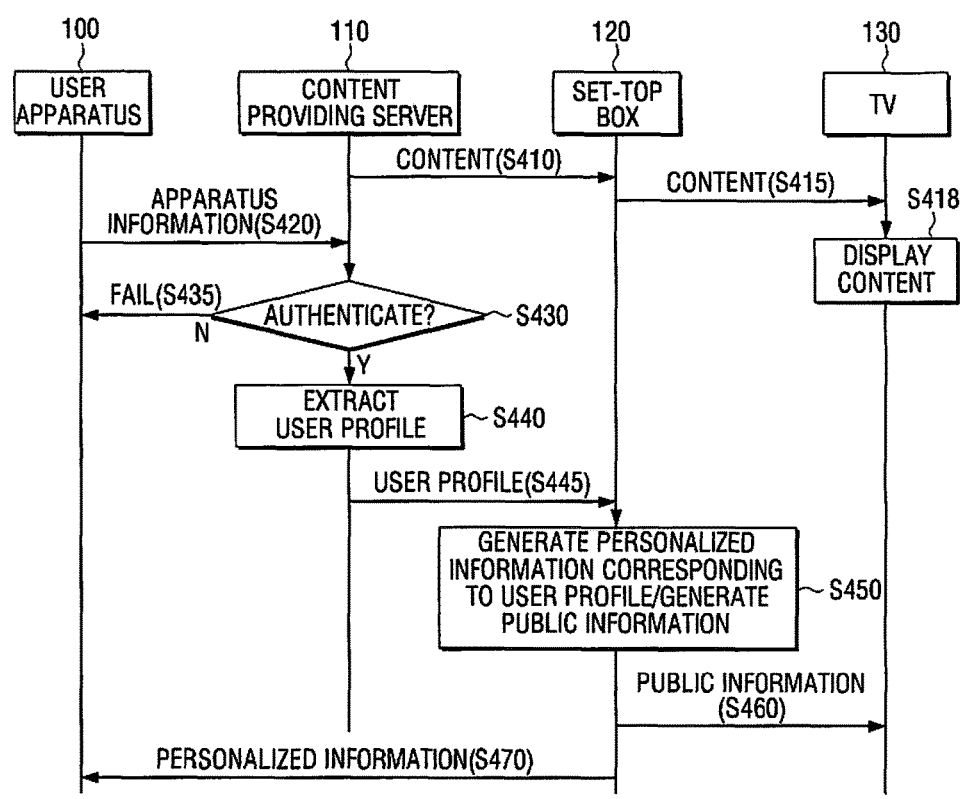
FIG. 4 is a flowchart illustrating a process of providing public information and personalized information in a content providing system according to an embodiment of the present invention.

FIG. 4 is a flowchart illustrating a process of providing public information and personalized information in a content providing system according to an embodiment of the present invention. Specifically, FIG. 4 illustrates the content providing server 110 receiving apparatus information and extracting a user profile, and the set-top box 120 generating personalized information and public information.

Because steps S410 to S440 are identical to steps S210 to S240 a repetitive description of these steps will not be provided below.

Referring to FIG. 4, the content providing server 110 transmits an extracted user profile to the set-top box 120 in step S445. In step S450, the set-top box 120 generates personalized information corresponding to the user profile along with public information corresponding to the content. Herein, the personalized information is information generated to correspond to a user profile and used in the user apparatus 100. The public information is information to be displayed on the TV 130 and related to the content.

In step S460, the set-top box 120 transmits public information to the TV 130. Subsequently, the TV 130 displays the received public information on the screen. For example, the TV 130 displays EPG information and rating information on the screen as public information.

In step S470, the set-top box 120 transmits personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described process illustrated in FIG. 4, a content providing system provides personalized information corresponding to a user to the user apparatus 100 based on apparatus information. Accordingly, the user may receive and view his or her personalized information through the user apparatus 100 without inputting personal information.

Figure 5:
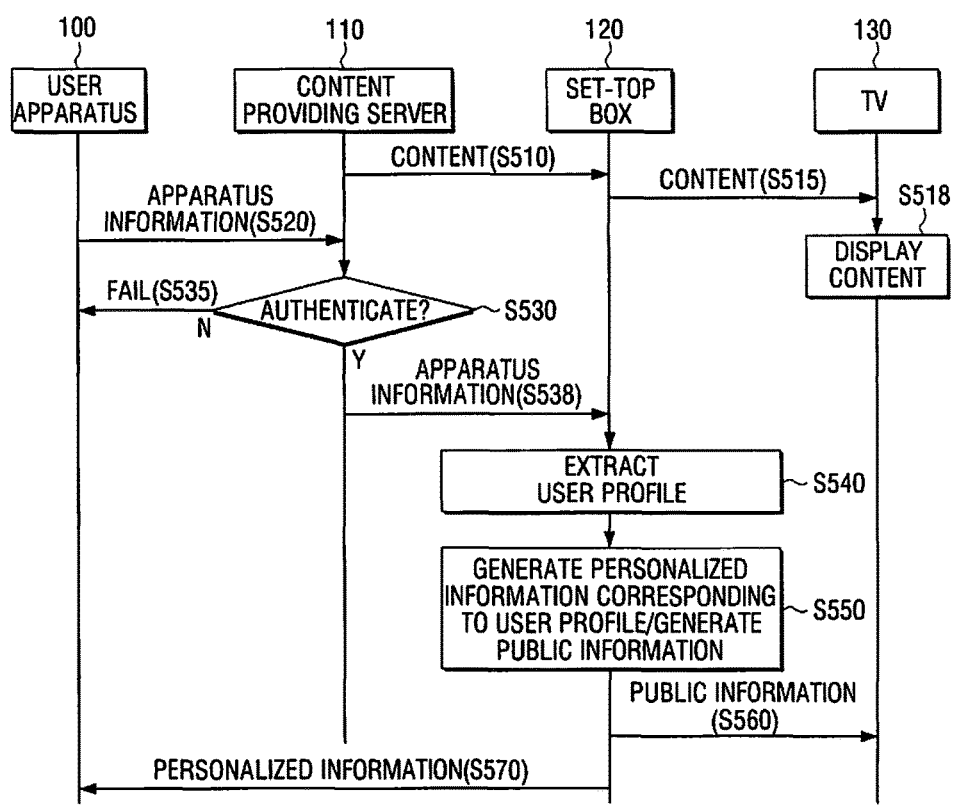
FIG. 5 is a flowchart illustrating a process of providing public information and personalized information in a content providing system according to an embodiment of the present invention.

FIG. 5 is a flowchart illustrating a process of providing public information and personalized information in a content providing system according to an embodiment of the present invention. Specifically, FIG. 5 illustrates the content providing server 110 receiving apparatus information, and the set-top box 120 extracting a user profile and generating personalized information and public information.

Because steps S510 to S535 are identical to steps S210 to S235 a repetitive description of these steps will not be provided below.

Referring to FIG. 5, if the authentication is successful in step S530, the content providing server 110 transmits the received apparatus information to the set-top box 120 in step S538. The set-top box 120 extracts a user profile corresponding to the received apparatus information in step S540. For example, the set-top box 120 stores a user profile database corresponding to user profiles in a plurality of apparatus information and extracts a user profile corresponding to apparatus information received from the user apparatus 100 from the user profile database.

In step S550, the set-top box 120 generates personalized information corresponding to the user profile along with public information corresponding to content. Herein, the personalized information is information generated to correspond to the user profile and used in the user apparatus 100. The public information is information to be displayed on the TV 130 and related to a content.

In step S560, the set-top box 120 transmits public information to the TV 130. Thereafter, the TV 130 displays the received public information on a screen thereof. For example, the TV 130 displays EPG information and rating information on the screen as public information.

In step S570, the set-top box 120 transmits personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described process of FIG. 5, a content providing system provides personalized information corresponding to a user to the user apparatus 100 based on apparatus information. Accordingly, the user may receive and view his or her personalized information through the user apparatus 100 without inputting personal information.

Figure 6:
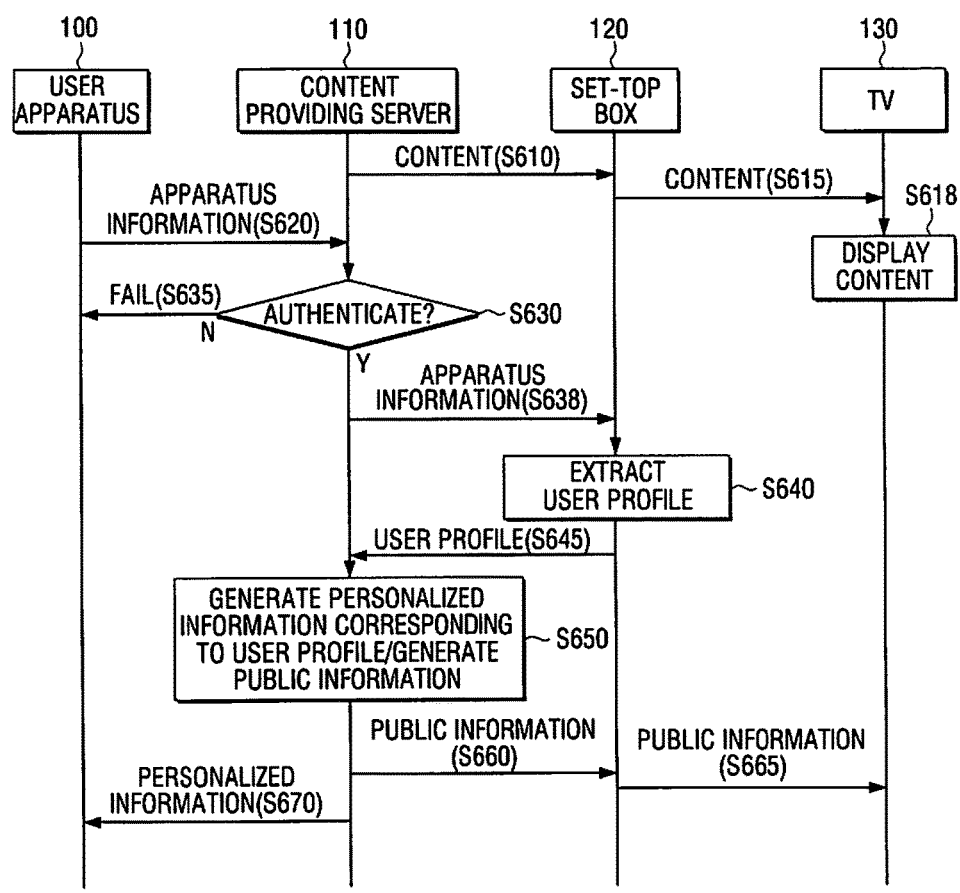
FIG. 6 is a flowchart illustrating a process of providing public information and personalized information in a content providing system according to an embodiment of the present invention.

FIG. 6 is a flowchart illustrating a process of providing public information and personalized information in a content providing system according to an embodiment of the present invention. Specifically, FIG. 6 illustrates the content providing server 110 receiving apparatus information, the set-top box 120 extracting a user profile, and the content providing server 110 generating personalized information and public information.

Because steps S610 to S640 are identical to steps S510 to S540 a repetitive description of these steps will not be provided below.

Referring to FIG. 6, the set-top box 120 transmits the extracted user profile to the content providing server 110 in step S645. In step S650, the content providing server 110 generates personalized information corresponding to the user profile along with public information corresponding to content. Herein, the personalized information is information generated to correspond to the user profile and used in the user apparatus 100. The public information is information to be displayed on the TV 130 and related to a content.

The content providing server 110 transmits public information to the set-top box 120 in step S660, and the set-top box 120 transmits the public information to the TV 130 in step S665. Thereafter, the TV 130 displays the received public information on the screen. For example, the TV 130 displays EPG information and rating information on the screen as public information.

In step S670, the content providing server 110 transmits personalized information to the user apparatus 100. Subsequently, the user apparatus 100 displays the personalized information on a screen thereof or performs a function using the personalized information. For example, if the personalized information is information on a recommended channel, the user apparatus 100 displays received information regarding a recommended channel on the screen.

Through the above-described process of FIG. 6, a content providing system provides personalized information corresponding to a user to the user apparatus 100 based on apparatus information. Accordingly, the user may receive and view his or her personalized information through the user apparatus 100 without inputting personal information.

Figure 7:
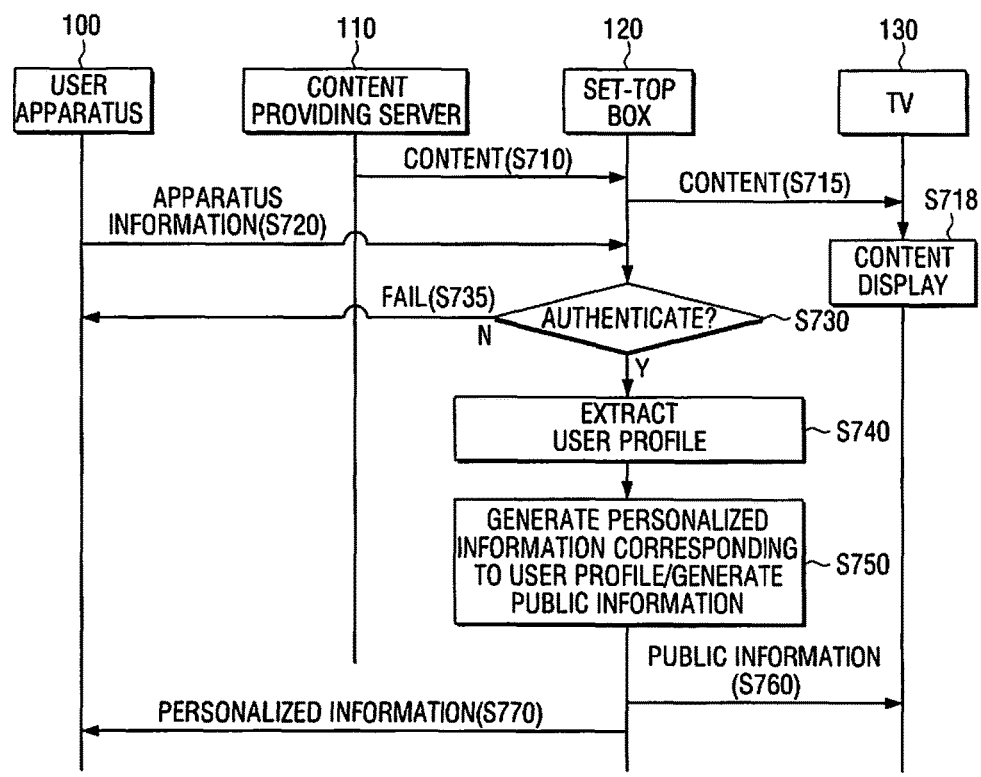
FIG. 7 is a flowchart illustrating a process of providing public information and personalized information in a content providing system according to an embodiment of the present invention.

FIG. 7 is a flowchart illustrating a process of providing public information and personalized information in a content providing system according to an embodiment of the present invention. Specifically, FIG. 7 illustrates the set-top box 120 receiving apparatus information, extracting a user profile, and generating the personalized information and the public information.

Referring to FIG. 7, the content providing server 110 transmits a content to the set-top box 120 in step S710. In step S715, the set-top box 120 transmits the received content to the TV 130. In step S7118, the TV 130 displays the received content.

A user inputs a command to receive personalized information through the user apparatus 100, and the user apparatus 100 transmits apparatus information to the set-top box 120 in step S720. In step S730, the set-top box 120 authenticates the user apparatus 100 using the received apparatus information, e.g., the set-top box 120 determines whether the user apparatus 100 is authorized to access the set-top box 120.

If the authentication fails, the set-top box 120 transmits an authentication failure message to the user apparatus 100 in step S735. In this case, the user apparatus 100 is not authorized to access the set-top box 120 and the process is terminated.

However, if the authentication is successful, the set-top box 120 extracts a user profile corresponding to the received apparatus information in step S740. For example, the set-top box 120 stores a user profile database corresponding to user profiles in a plurality of apparatus information and extracts a user profile corresponding to apparatus information received from the user apparatus 100 from the user profile database.

In step S750, the set-top box 120 generates personalized information corresponding to a user profile along with public information corresponding to content. Herein, the personalized information is information generated to correspond to a user profile and used in the user apparatus 100. The public information is information to be displayed on the TV 130 and related to a content.

In step S760, the set-top box 120 transmits public information to the TV 130. Thereafter, the TV 130 displays the received public information on the screen. For example, the TV 130 displays EPG information and rating information on the screen as public information.

In step S770, the set-top box 120 transmits personalized information to the user apparatus 100. Subsequently, the user apparatus 100 displays the personalized information on a screen thereof or performs a function using the personalized information. For example, if the personalized information is information on a recommended channel, the user apparatus 100 displays received information regarding a recommended channel on the screen.

Through the above-described process of FIG. 7, a content providing system provides personalized information corresponding to a user to the user apparatus 100 based on apparatus information. Accordingly, the user may receive and view his or her personalized information through the user apparatus 100 without inputting personal information.

Figure 8:
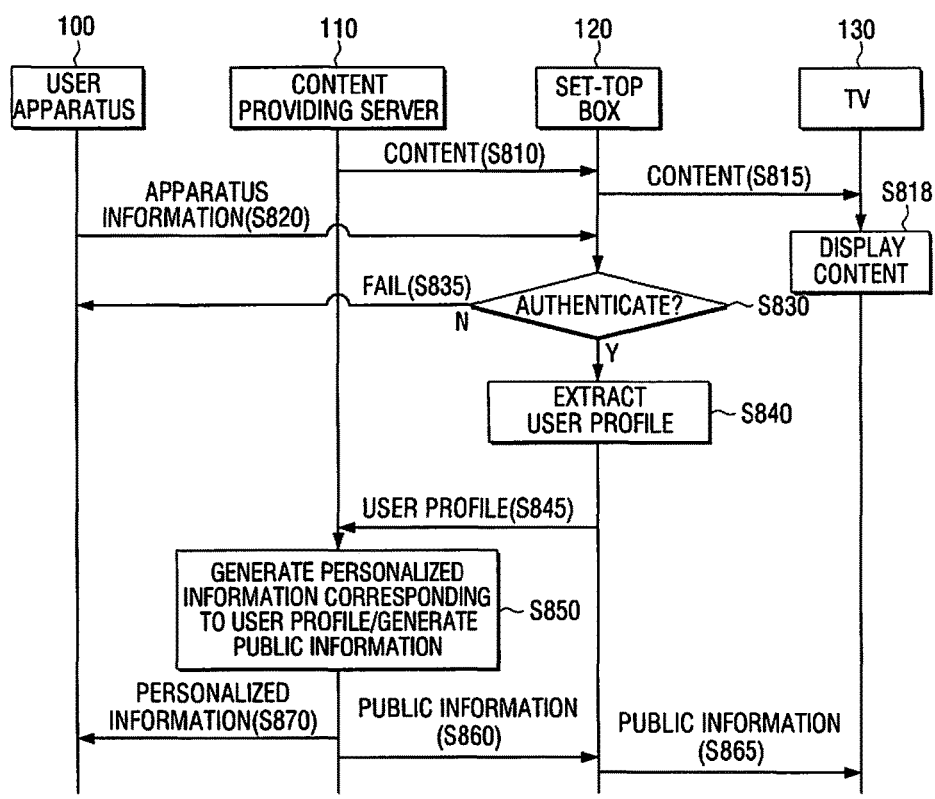
FIG. 8 is a flowchart illustrating a process of providing public information and personalized information in a content providing system according to an embodiment of the present invention.

FIG. 8 is a flowchart illustrating a process of providing public information and personalized information in a content providing system according to an embodiment of the present invention. Specifically, FIG. 8 illustrates the set-top box 120 receiving apparatus information and extracting a user profile, and the content providing server 110 generating personalized information and public information.

Because steps S810 to S840 are identical to steps S710 to S740 a repetitive description of these steps will not be provided below.

Referring to FIG. 8, the set-top box 120 transmits the extracted user profile to the content providing server 110 in step S845. In step S850, the content providing server 110 generates personalized information corresponding to the user profile along with public information corresponding to content. Herein, the personalized information is information generated to correspond to a user profile and used in the user apparatus 100. The public information is information to be displayed on the TV 130 and related to a content.

The content providing server 110 transmits public information to the set-top box 120 in step S860, and the set-top box 120 transmits the public information to the TV 130 in step S865. Thereafter, the TV 130 displays the received public information on the screen. For example, the TV 130 displays EPG information and rating information on the screen as public information.

In step S870, the content providing server 110 transmits personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described process of FIG. 8, a content providing system provides personalized information corresponding to a user to the user apparatus 100 based on apparatus information. Accordingly, the user may receive and view his or her personalized information through the user apparatus 100 without inputting personal information.

Figure 9:
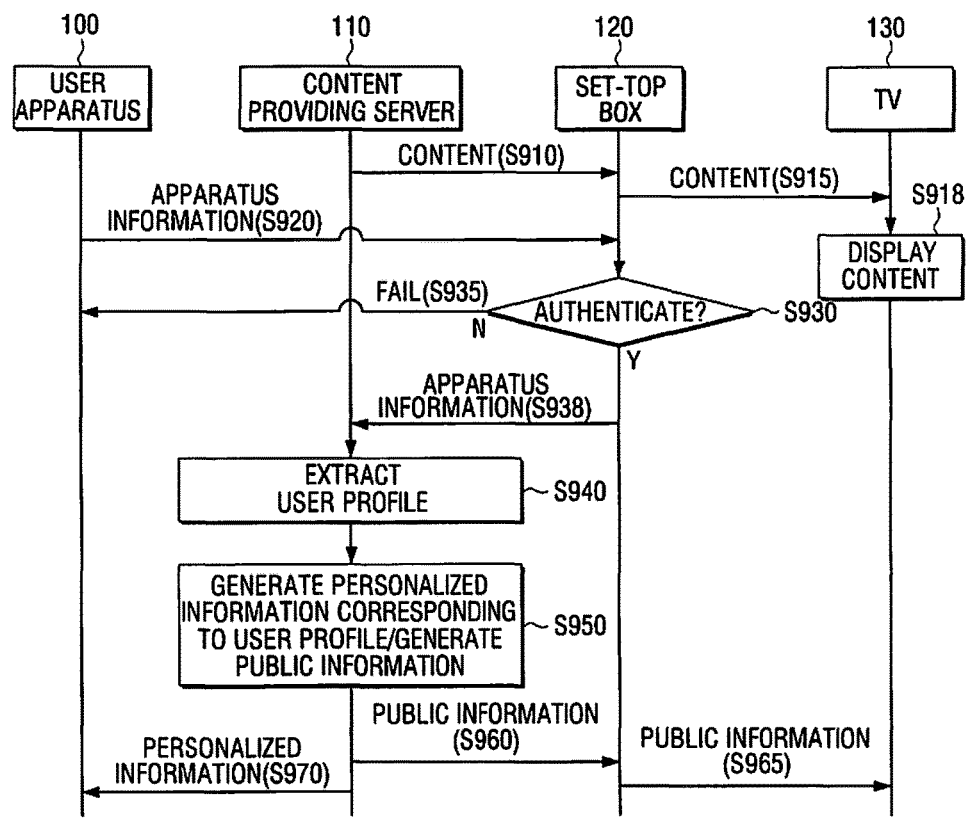
FIG. 9 is a flowchart illustrating a process of providing public information and personalized information in a content providing system according to an embodiment of the present invention.

FIG. 9 is a flowchart illustrating a process of providing public information and personalized information in a content providing system according to an embodiment of the present invention. Specifically, FIG. 9 illustrates the set-top box 120 receiving apparatus information, and the content providing server 110 extracting a user profile and generating personalized information and public information.

Because steps S910 to S935 are identical to steps S810 to S835 a repetitive description of these steps will not be provided below.

Referring to FIG. 9, if the authentication is successful, the set-top box 120 transmits received apparatus information to the content providing server 110 in step S938. In step S940, the content providing server 110 extracts a user profile corresponding to the received apparatus information. For example, the content providing server 110 stores a user profile database corresponding to user profiles in a plurality of apparatus information and extracts a user profile corresponding to apparatus information received from the user apparatus 100 from the user profile database.

In step S950, the content providing server 110 generates personalized information corresponding to the user profile along with public information corresponding to a content. Herein, the personalized information is information generated to correspond to a user profile and used in the user apparatus 100. The public information is information to be displayed on the TV 130 and related to a content.

The content providing server 110 transmits public information to the set-top box 120 in step S960, and the set-top box 120 transmits the public information to the TV 130 in step S965. Thereafter, the TV 130 displays the received public information on the screen. For example, the TV 130 displays EPG information and rating information on the screen as public information.

In step S970, the content providing server 110 transmits personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described processes, a content providing system provides personalized information corresponding to a user to the user apparatus 100 based on apparatus information. Accordingly, the user may receive and view his or her personalized information through the user apparatus 100 without inputting personal information.

Figure 10:
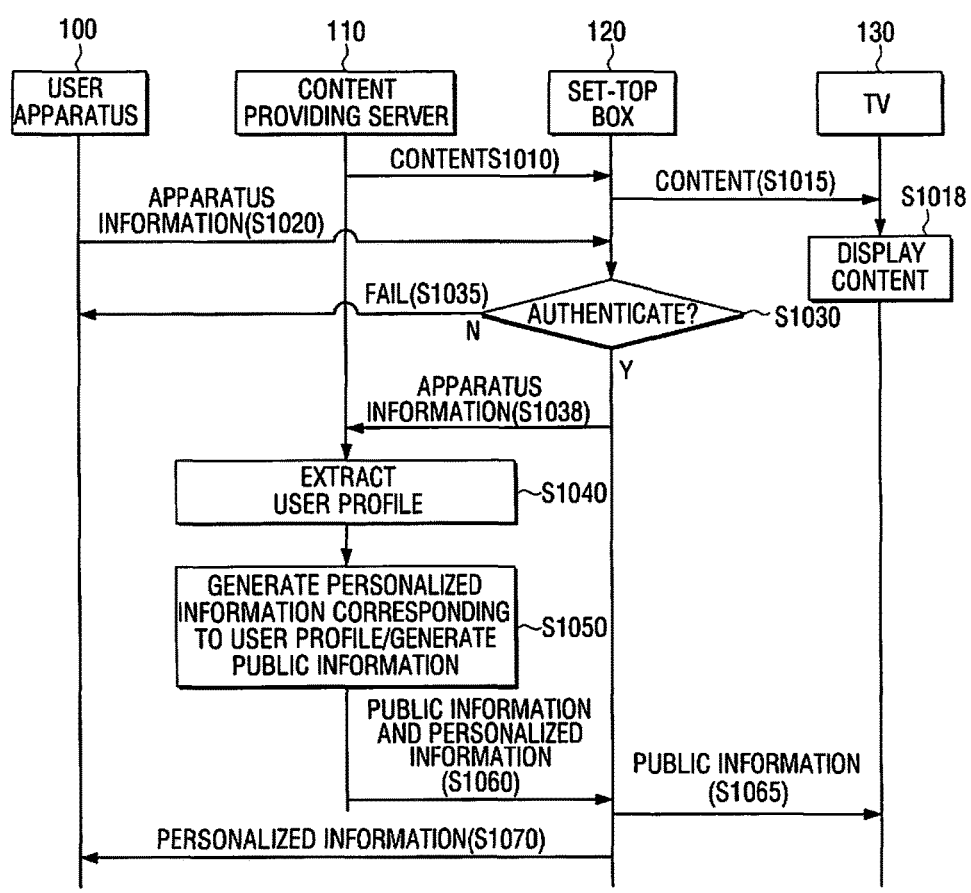
FIG. 10 is a flowchart illustrating a process of providing public information and personalized information in a content providing system according to an embodiment of the present invention.

FIG. 10 is a flowchart illustrating a process of providing public information and personalized information in a content providing system according to an embodiment of the present invention. Specifically, FIG. 10 illustrates the set-top box 120 receiving apparatus information, and the content providing server 110 extracting a user profile and generating personalized information and public information. However, unlike in FIG. 9, the content providing server 110 transmits the public information and the personalized information to the set-top box 120, and the set-top box 120 transmits the public information to the TV 130 and the personalized information to the user apparatus 100.

Additionally, because steps S1010 to S1050 are identical to steps S910 to S950 a repetitive description of these steps will not be provided below.

Referring to FIG. 10, the content providing server 110 transmits public information and personalized information to the set-top box 120 in step S1060, and the set-top box 120 transmits the public information to the TV 130 in step S1065. Thereafter, the TV 130 displays the received public information on the screen. For example, the TV 130 displays EPG information and rating information on the screen as public information.

In step S1070, the set-top box 120 transmits the personalized information to the user apparatus 100. Subsequently, the user apparatus 100 displays the personalized information on the screen or performs a function using the personalized information. For example, if the personalized information is information on a recommended channel, the user apparatus 100 displays received information regarding a recommended channel on the screen.

Through the above-described process of FIG. 10, a content providing system provides personalized information corresponding to a user to the user apparatus 100 based on apparatus information. Accordingly, the user may receive and view his or her personalized information through the user apparatus 100 without inputting personal information.

Figure 11:
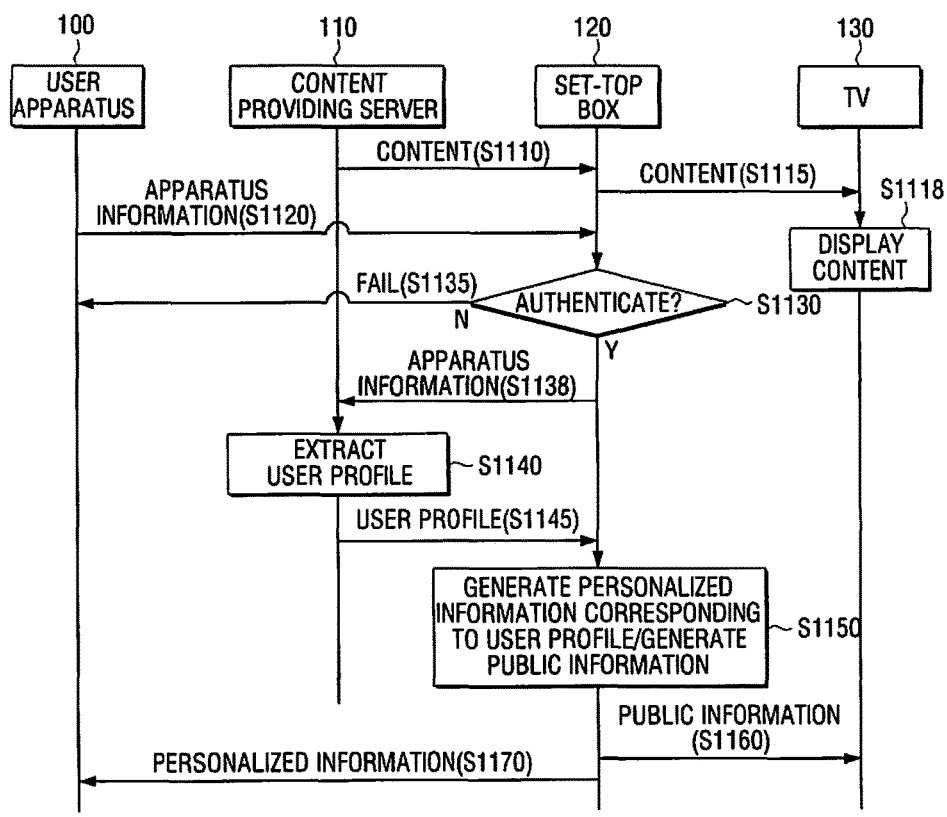
FIG. 11 is a flowchart illustrating a process of providing public information and personalized information in a content providing system according to an embodiment of the present invention.

FIG. 11 is a flowchart illustrating a process of providing public information and personalized information in a content providing system according to an embodiment of the present invention. FIG. 11 illustrates the set-top box 120 receiving apparatus information, the content providing server 110 extracting a user profile, and the set-top box 120 generating the personalized information and the public information.

Additionally, because steps S1110 to S1140 are identical to steps S910 to S940 a repetitive description of these steps will not be provided below.

Referring to FIG. 11, the content providing server 110 transmits the extracted user profile to the set-top box 120 in step S1145. In step S1150, the set-top box 120 generates personalized information corresponding to the user profile along with public information corresponding to content. Herein, the personalized information is information generated to correspond to a user profile and used in the user apparatus 100. The public information is information to be displayed on the TV 130 and related to a content.

The set-top box 120 transmits public information to the TV 130 in step S1160. Thereafter, the TV 130 displays the received public information on the screen. For example, the TV 130 displays EPG information and rating information on the screen as public information.

In step S1170, the set-top box 120 transmits personalized information to the user apparatus 100. Subsequently, the user apparatus 100 displays the personalized information on a screen thereof or performs a function using the personalized information. For example, if the personalized information is information on a recommended channel, the user apparatus 100 displays received information regarding a recommended channel on the screen.

Through the above-described process of FIG. 11, a content providing system provides personalized information corresponding to a user to the user apparatus 100 based on apparatus information. Accordingly, the user may receive and view his or her personalized information through the user apparatus 100 without inputting personal information.

Figure 12:
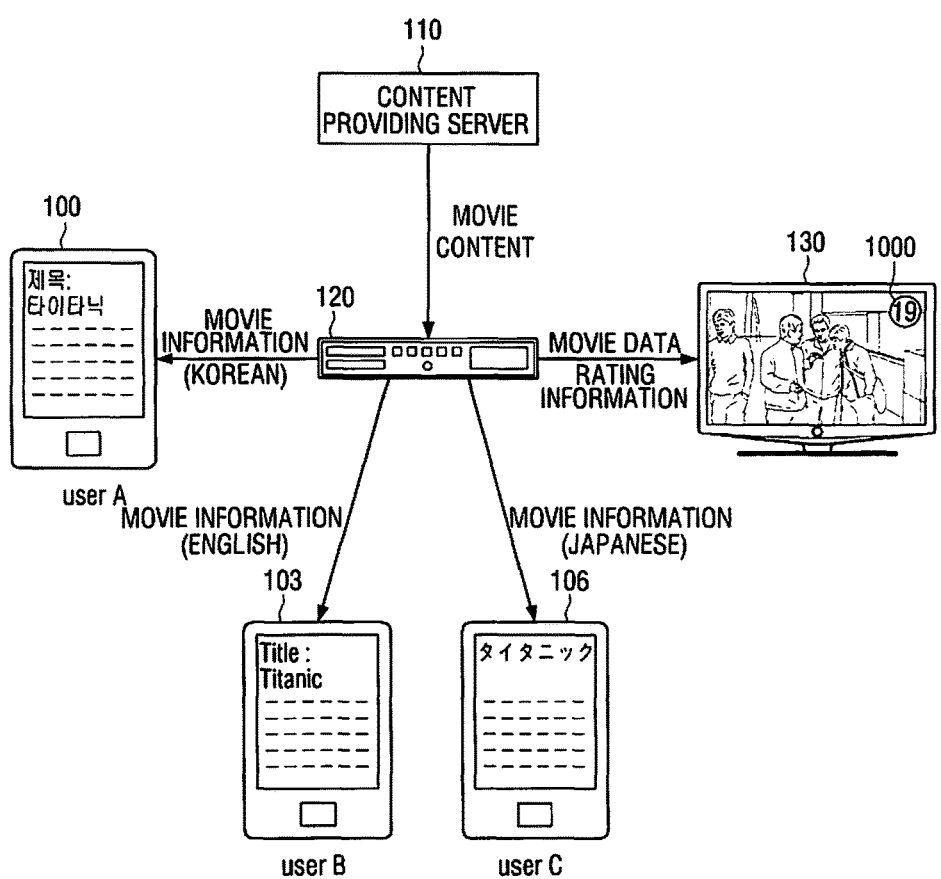
FIG. 12 is a diagram illustrating three user apparatuses being provided with personalized information in different languages by a content providing system, according to an embodiment of the present invention.

FIG. 12 illustrates three user apparatuses that are provided with personalized information in a different languages by a content providing system, according to an embodiment of the present invention.

Referring to FIG. 12, the content providing server 110 transmits movie content to the set-top box 120. The set-top box 120 transmits the received movie content data to the TV 130, which displays the movie content on a screen thereof.

Additionally, the set-top box 120 transmits rating information to the TV 130 as public information. As illustrated in FIG. 12, the TV 130 displays the rating information 1000 on the screen. Further, the set-top box 120 transmits movie information to three user apparatuses 100, 103, and 106, as personalized information.

In FIG. 12, a user of the first user apparatus 100 (USER A) is Korean, a user of the second user apparatus 103 (USER B) is American, and a user of the third user apparatus 106 (USER C) is Japanese. Accordingly, a user profile of the first user apparatus 100 specifies Korean as nationality information and Korean as language information, a user profile of the second user apparatus 103 specifies American as nationality information and English as language information, and a user profile of the third user apparatus 106 specifies Japan as nationality information and Japanese as language information. Accordingly, the set-top box 120 generates and transmits movie information in Korean, English, and Japanese as personalized information based on each user profile of the first user apparatus 100, the second user apparatus 103, and the third user apparatus 106, respectively.

Therefore, it can be seen that the movie information is displayed in Korean on the screen of the first user apparatus 100, in English on the screen of the second user apparatus 103, and in Japanese on the screen of the third user apparatus 106.

Figure 13:
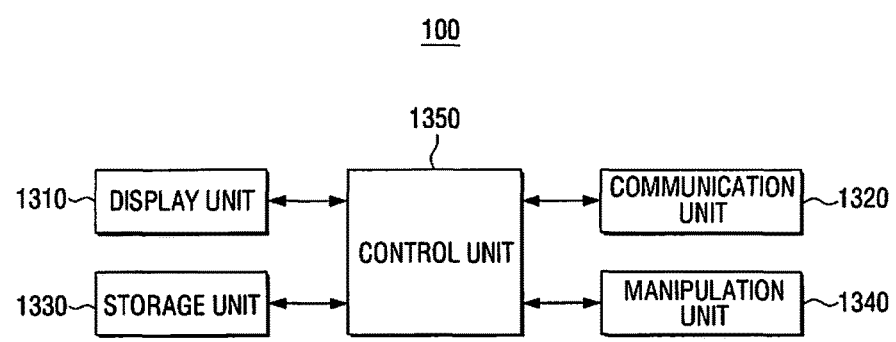
FIG. 13 is a block diagram illustrating a user apparatus according to an embodiment of the present invention.

FIG. 13 is a block diagram illustrating a user apparatus according to an embodiment of the present invention.

Referring to FIG. 13, the user apparatus 100 includes a display unit 1310, a communication unit 1320, a storage unit 1330, a manipulation unit 1340, and a control unit 1350.

The display unit 1310 displays an image for providing functions of the user apparatus 100. In addition, the display unit 110 displays Graphic User Interfaces (GUIs) on the screen for a user's manipulation. Further, the display unit 110 may display received personalized information on the screen.

The communication unit 1320 is communicably connected to a content providing server or a set-top box through a mobile communication network, a local wireless communication network, or an Internet network. Herein, the mobile communication network may be a Group Special Mobile (GSM) communication network, a Wideband Code Division Multiple Access (WCDMA) communication network, etc.

The communication unit 1320 is connected to a mobile communication network through a mobile communication base station. In addition, the communication unit 1320 is connected to an Internet network through a wireless Access Point (AP) using a wireless LAN. The communication unit 1320 may perform communication using WIFI® (wireless LAN), Bluetooth®, or ZigBee® as a local wireless communication network.

Specifically, the communication unit 1320 transmits a request for personalized information and apparatus information to a content providing server or a set-top box, and then receives personalized information from the content providing server or the set-top box in response.

The storage unit 1330 stores programs for performing various functions of the user apparatus 100. In addition, the storage unit 1330 stores apparatus information, i.e., information on the user apparatus 100, and a user profile. For example, the storage unit 1330 may be embodied as a hard disk or a non-volatile memory.

The manipulation unit 1340 receives a user's manipulation and transmits the received manipulation to the control unit 1350. The manipulation unit 1340 may be a button or a touch screen disposed on the user apparatus 100.

The control unit 1350 controls overall operation of the user apparatus 100. Specifically, the control unit 1350 controls the display to display personalized information on the screen or perform a function using personalized information. In addition, the control unit 1350 performs functions for performing methods illustrated in FIGS. 2 to 11.

Figure 14:
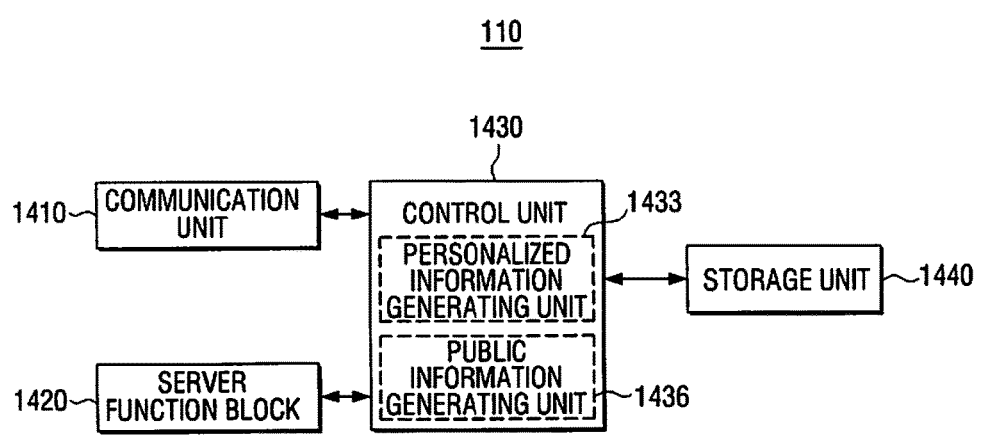
FIG. 14 is a block diagram illustrating a content providing server according to an embodiment of the present invention.

FIG. 14 is a block diagram illustrating a content providing server according to an embodiment of the present invention.

Referring to FIG. 14, the content providing server 110 includes a communication unit 1410, a server function block 1420, a control unit 1430, and a storage unit 1440.

The communication unit 1410 is communicably connected to a user apparatus and a set-top box through an Internet network. The communication unit 1410 may be embodied using a network interface such as a wired LAN or a wireless LAN. The communication unit 1410 transmits a content to be displayed on a TV to the set-top box. In addition, the communication unit 1410 receives apparatus information from the user apparatus or the set-top box. The communication unit 1410 transmits the apparatus information received from the user apparatus to the set-top box.

The server function block 1420 performs an original function of the content providing server 110. For example, the server function block 1420 executes an operating system and various programs so that the server 110 provides content to the set-top box.

The storage unit 1440 stores user profiles corresponding to various apparatus information as a database. The storage unit 1440 may be embodied as a hard disk or a non-volatile memory.

The control unit 1430 controls overall operation of the content providing server 110. Specifically, the control unit 1430 extracts a user profile corresponding to apparatus information. In addition, the control unit 1430 may control the server 110 to transmit a user profile to the set-top box.

Additionally, the control unit 1430 includes a personalized information generating unit 1433 and a public information generating unit 1436. The personalized information generating unit 1433 generates personalized information based on a user profile. Specifically, personalized information is generated based on a user's personal information and may include a recommended channel, a recommended content and a commercial. In addition, personalized information may be a list of broadcast programs or a list of content generated based on information on usage history of a user.

The public information generating unit 1436 generates public information using information regarding content. Public information is information to be displayed on the TV and represents information regarding content.

The control unit 1430 controls the server 110 to transmit the generated personalized information to a user apparatus and the generated public information to the set-top box or the TV.

Figure 15:
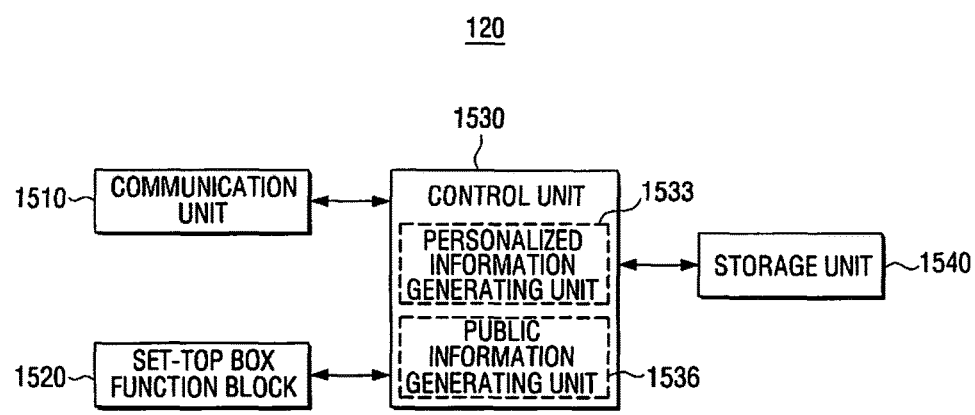
FIG. 15 is a block diagram illustrating a set-top box according to an embodiment of the present invention.

FIG. 15 is a block diagram illustrating a set-top box according to an embodiment of the present invention.

Referring to FIG. 15, the set-top box 120 includes a communication unit 1510, a set-top box function block 1520, a control unit 1530, and a storage unit 1540.

The communication unit 1510 is communicably connected to a user apparatus and a content providing server through an Internet network. The communication unit 1510 may be embodied using a network interface such as a wired LAN or a wireless LAN. The communication unit 1510 transmits content to be displayed on a TV to the TV. In addition, the communication unit 1510 receives apparatus information from the user apparatus or the content providing server. The communication unit 1510 transmits the apparatus information received from the user apparatus to the content providing server.

The set-top box function block 1520 performs an original function of the set-top box 120. For example, the set-top box function block 1520 executes an operating system and various programs so as to provide input content to the TV.

The storage unit 1540 stores user profiles corresponding to various apparatus information as a database. The storage unit 1540 may be embodied as a hard disk or a non-volatile memory.

The control unit 1530 controls the overall operation of the set-top box 120. Specifically, the control unit 1530 extracts a user profile corresponding to apparatus information. In addition, the control unit 1530 may control the set-top box 120 to transmit a user profile to the content providing server.

In addition, the control unit 1530 includes a personalized information generating unit 1533 and a public information generating unit 1536. The personalized information generating unit 1533 generates personalized information based on a user profile. Specifically, personalized information is generated based on a user's personal information and may include a recommended channel, a recommended content and a commercial. In addition, personalized information may be a list of broadcast programs or a list of content generated based on information on usage history of a user.

The public information generating unit 1536 generates public information using information regarding contents. Public information is information to be displayed on the TV and represents information regarding content.

The control unit 1530 controls the set-top box 120 to transmit the generated personalized information to a user apparatus and the generated public information to the TV.

As described above, a content providing server extracts a user profile corresponding apparatus information from a stored database, but a user profile corresponding to apparatus information may be obtained in other ways. Specifically, the content providing server may receive a user profile corresponding to apparatus information from a user apparatus.

In addition, a set-top box extracts a user profile corresponding apparatus information from stored database, but a user profile corresponding to apparatus information may be obtained in other ways. Specifically, the set-top box may receive a user profile corresponding to apparatus information from a user apparatus.

Further, in the embodiments described above, an image apparatus has been provide using a set-top box and a television, by way of example. However, an image apparatus may be other kinds of image apparatuses, e.g., a Blu-Ray® player, a Digital Video Disk (DVD) player, a monitor, a home theater, etc.

Further, an image apparatus may consist of one image apparatus, e.g., where a television performs the functions of a set-top box.

In accordance with the various embodiments described above, a method is provided for providing public information to an image apparatus and for providing personalized information to a user apparatus by receiving apparatus information from a user apparatus, obtaining a user profile corresponding to the apparatus information, and generating public information and personalized information corresponding to the user profile may be provided.

Although certain embodiments of the present invention have been shown and described above, it will be understood by those skilled in the art that various changes in form and details may be made therein without departing from the spirit and scope of the present invention as defined by the appended claims and their equivalents.

What is claimed is:

1. A method for providing information to a plurality of user apparatuses of a plurality of users watching content on a display apparatus, the method comprising:

receiving, by a set top box (STB), the content from a content providing server;

transmitting, by the set top box, the content to the display apparatus;

displaying, by the display apparatus, the content in response to receiving the content from the set top box;

receiving, by the STB, from each of the plurality of user apparatuses, apparatus information of each user apparatus;

performing, by the STB, authentication of each of the plurality of user apparatuses using the apparatus information received from each user apparatus;

in response to the authentication being performed, transmitting, by the STB, to the content providing server, a user profile corresponding to each authenticated user apparatus among the plurality of user apparatuses:

generating, by the content providing server, personalized information for a plurality of authenticated user apparatuses among the plurality of user apparatuses, based on the user profile corresponding to the each authenticated user apparatus;

generating, by the content providing server, public information corresponding to the content received from the content providing server;

transmitting, by the content providing server, the generated personalized information directly to the each authenticated user apparatus for which personalized information is generated;

transmitting, by the content providing server, the generated public information to the display apparatus, through the STB; and displaying, by the display apparatus, the public information along with the content in response to receiving the public information from the STB while the content is displayed by the display apparatus, wherein the plurality of authenticated user apparatuses comprise a first authenticated user apparatus of a first user and a second authenticated user apparatus of a second user, wherein, if a user profile of the first authenticated user apparatus comprises nationality information and language information of the first user and a user profile of the second authenticated user apparatus comprises nationality information and language information of the second user, generating, by the content providing server, the personalized information comprises:

generating a first personalized information in a first language based on the nationality information and the language information of the first user and generating a second personalized information in a second language based on the nationality information and the language information of the second user, wherein transmitting, by the content providing server, the generated personalized information comprises:

transmitting the first personalized information to the first authenticated user apparatus and transmitting the second personalized information to the second authenticated user apparatus, wherein the first language is different from the second language, and wherein the public information and the content which are displayed by the display apparatus are watched by the first user and the second user through the display apparatus.

2. The method of claim 1, wherein the personalized information includes at least one of a recommended channel, recommended content, and a commercial.

3. A set top box (STB), comprising:
a communication unit which can communicate with a content providing server and a plurality of user apparatuses; and
a processor which:
receives, via the communication unit, content from the content providing server;
transmits, via the communication unit, the received content to a display apparatus which displays the content in response to receiving the content from the set top box;
receives, from each of the plurality of user apparatuses, apparatus information of each user apparatus;
performs authentication of each of the plurality of user apparatuses using the apparatus information received from each user apparatus;
in response to the authentication being performed, transmits, via the communication unit, to the content providing, server, a user profile corresponding to the each authenticated user apparatus;
receives, via the communication unit, from the content providing server, public information corresponding to the content;
and
transmits the received public information to the display apparatus so that the display apparatus displays the public information along with the content in response to receiving the public information from the STB while the content is displayed by the display apparatus,
wherein the content providing server
generates personalized information for a plurality of authenticated user apparatuses among the plurality of user apparatuses, based on the user profile corresponding to the each authenticated user apparatus received from the STB,
generates the public information corresponding to the content,
transmits the generated personalized information directly to the each authenticated user apparatus for which personalized information is generated, and
transmits the generated public information to the STB,
wherein the plurality of authenticated user apparatuses comprise a first authenticated user apparatus of a first user and a second authenticated user apparatus of a second user,
wherein, if a user profile of the first authenticated user apparatus comprises nationality information and language information of the first user and a user profile of the second authenticated user apparatus comprises nationality information and language information of the second user, generating, by the content providing server, the personalized information comprises:
generating a first personalized information in a first language based on the nationality information and the language information of the first user and generating a second personalized information in a second language based on the nationality information and the language information of the second user,
wherein transmitting, by the content providing server, the generated personalized information comprises:
transmitting the first personalized information to the first authenticated user apparatus and transmitting the second personalized information to the second authenticated user apparatus, and
wherein the first language is different from the second language, and
wherein the public information and the content which are displayed by the display apparatus are watched by the first user and the second user through the display apparatus.

4. The STB of claim 3, wherein the personalized information includes at least one of a recommended channel, recommended content, and a commercial.

5. A method for providing information concerning content on a display apparatus to a user apparatus, comprising:
transmitting, to a set top box (STB) which receives content from a content providing server and provides it to the display apparatus, apparatus information of the user apparatus; and if the STB successfully authenticates the user apparatus using the apparatus information, transmitting, by the STB, to the content providing server, a user profile corresponding to the authenticated user apparatus, generating, by the content providing server, personalized information for the authenticated user apparatus, based on the user profile corresponding to the authenticated user apparatus, generating, by the content providing server, public information corresponding to the content, and receiving, by the authenticated user apparatus, directly from the content providing server, the personalized information, wherein the display apparatus displays public information along with the content in response to receiving the public information from the content providing server, through the set top box, while the content is displayed by the display apparatus, wherein the authenticated user apparatus comprises a first authenticated apparatus of a first user and there is a second authenticated user apparatus of a second user, wherein, if a user profile of the first authenticated user apparatus comprises nationality information and language information of the first user and a user profile of the second authenticated user apparatus comprises nationality information and language information of the second user, the personalized information received by the first user is an a first language based on the nationality information and the language information in the user profile corresponding to the first user and the second authorized user apparatus receives personalized information in a second language based on the nationality information and the language information in the user profile corresponding to the second user, and wherein the first language is different from the second language, and wherein the public information and the content which are displayed by the display apparatus are watched by the first user and the second user through the display apparatus.

* * * * *

UNITED STATES PATENT AND TRADEMARK OFFICE
CERTIFICATE OF CORRECTION

PATENT NO. : 10,275,783 B2
APPLICATION NO. : 13/026593
DATED : April 30, 2019
INVENTOR(S) : Hyun-joo Oh et al.

Page 1 of 1

It is certified that error appears in the above-identified patent and that said Letters Patent is hereby corrected as shown below:

In the Claims

In Column 15, Claim 1, Lines 9 and 10, "mation corresponding to the content received from the content providing server;" should be -- mation corresponding to the content; --

Signed and Sealed this
Third Day of September, 2019

Andrei Iancu
*Director of the United States Patent and Trademark Office*